Oct. 24, 1939.  H. GILMORE  2,177,176
ENDLESS SLIDE RULE
Filed Jan. 20, 1938   3 Sheets-Sheet 2

Inventor.
Howard Gilmore
by Heard Smith & Tennant
Attys.

Oct. 24, 1939.   H. GILMORE   2,177,176
ENDLESS SLIDE RULE
Filed Jan. 20, 1938   3 Sheets-Sheet 3

Inventor.
Howard Gilmore
by Heard Smith & Tennant.
Attys

UNITED STATES PATENT OFFICE 2,177,176

ENDLESS SLIDE RULE

Howard Gilmore, Brookline, Mass.

Application January 20, 1938, Serial No. 185,863

12 Claims. (Cl. 235—84)

This invention relates to improvements in slide rules of the endless type comprising a base or support having mounted upon it juxtaposed complementary circular working and result scales provided with graduations proportional to the logarithms of the numbers on said scales and rotatable relatively to each other about a common axis and to a fixed index.

The principal object of the invention is to provide a slide rule of this type which can be economically constructed in suitable sizes and easily and readily manipulated with accuracy.

In usual endless slide rule mechanisms of this type it is necessary to restrain the movement of the result scale by the fingers or by the operation of some clutch arrangement while the working scale is rotated relatively to the result scale.

One of the objects of the invention is to provide a slide rule of this type having means for applying friction differentially to the respective scales in such manner as to cause conjoint rotation of the scales upon manual rotation of the result scale, and which will prevent rotation of the result scale upon manual rotation of the working scale.

A further object of the invention is to provide endless slide rule members with means which will prevent slippage of the fingers of the operator when manipulating said members and which will enable the slide rule members to be actuated with a minimum pressure of the fingers.

More specifically the invention comprises a slide rule of the endless type in which the working and result scales are arranged in superimposed relation relatively to a suitable base or support in which frictional means are interposed between the result scale and the base or support upon which it is mounted, and other frictional means interposed between the result scale and the working scale adapted to produce such lesser resistance to relative rotation of the scale members as to permit rotation of the working scale without moving the result scale relatively to the fixed index, but which will permit conjoint rotation of the working scale and the result scale when the result scale is rotated.

Desirably the result scale is fixedly secured to a shaft which is rotatably mounted in the base or support and the working scale is rotatably mounted upon said shaft.

Suitable means are provided for maintaining frictional engagement between the working and result scales and between the result scale and the base and differential friction between the working and result scales and between the result scale and the base is accomplished by interposing suitable frictional devices preferably at different radial distances from the axis of rotation operable in conjunction with a pressure applying spring or springs to produce the desired result as will hereinafter more fully appear.

Another object of the invention is to provide a construction of the character described in which the scale members are supported in such an inclined position that the scales and index may be readily observed and at the same time so positioned that their manipulation is carried out in a natural manner, the upper scale member being manipulated to carry out the process of multiplication and the lower scale member being manipulated to carry out the process of division, which is a relation analogous to the location of the numerator and denominator of a fraction, consequently the manipulation carried out when solving a problem is that of a natural impulse.

A further object of the invention is to provide an endless slide rule of the character described in which the relatively movable parts are so arranged that a simple decimal point indicator may be easily and cheaply embodied therein or detachably secured thereto.

Another object of the invention is to provide an endless slide rule of the character above described in which the rotatable working scale member may be provided with other suitable scales and the shaft to which the result scale member is secured provided with a supplementary index cooperating with such additional scales as to indicate other mathematical functions resulting from the manipulation of the working and result scales, such as the reciprocal of a result as indicated on the result scale, and sines, tangents, etc., the scales of which are not shown in the drawings.

These and other objects and features of the invention will more fully appear from the following description and the accompanying drawings and will be particularly pointed out in the claims.

Figure 1:
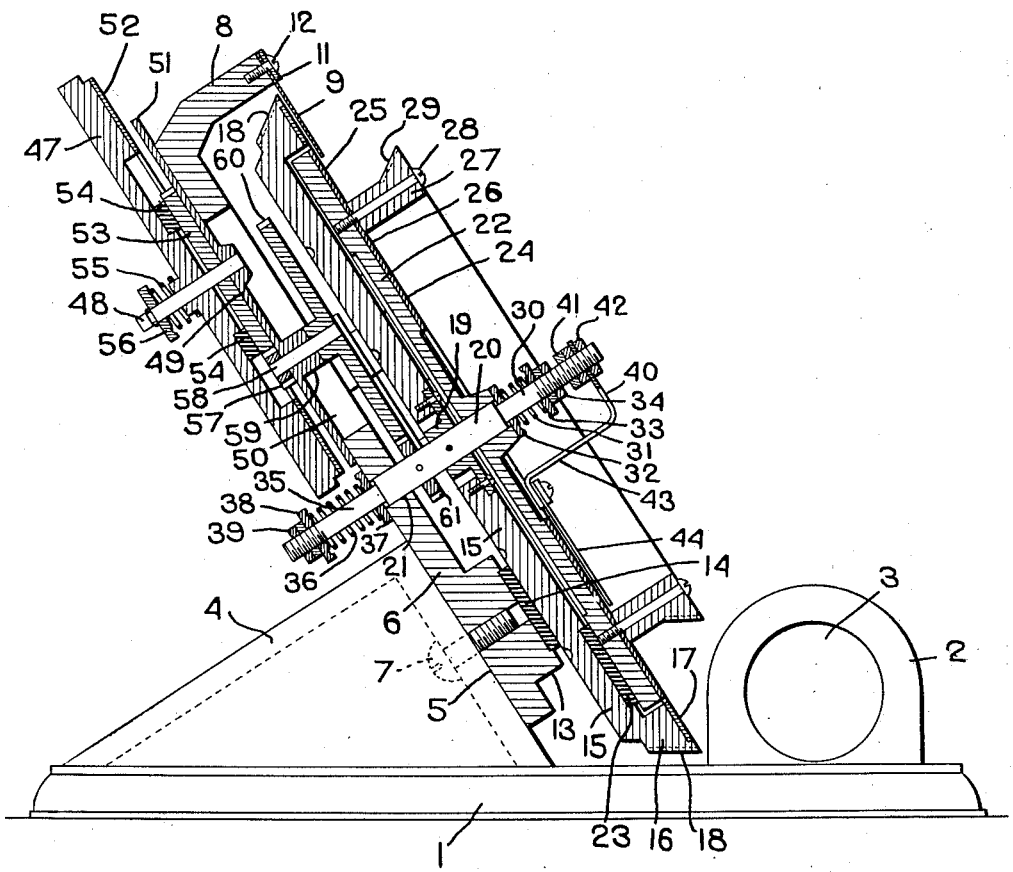
Fig. 1 is a vertical sectional view of an endless slide rule embodying the invention mounted in inclined position upon a suitable stand which is shown in elevation.
Figure 2:
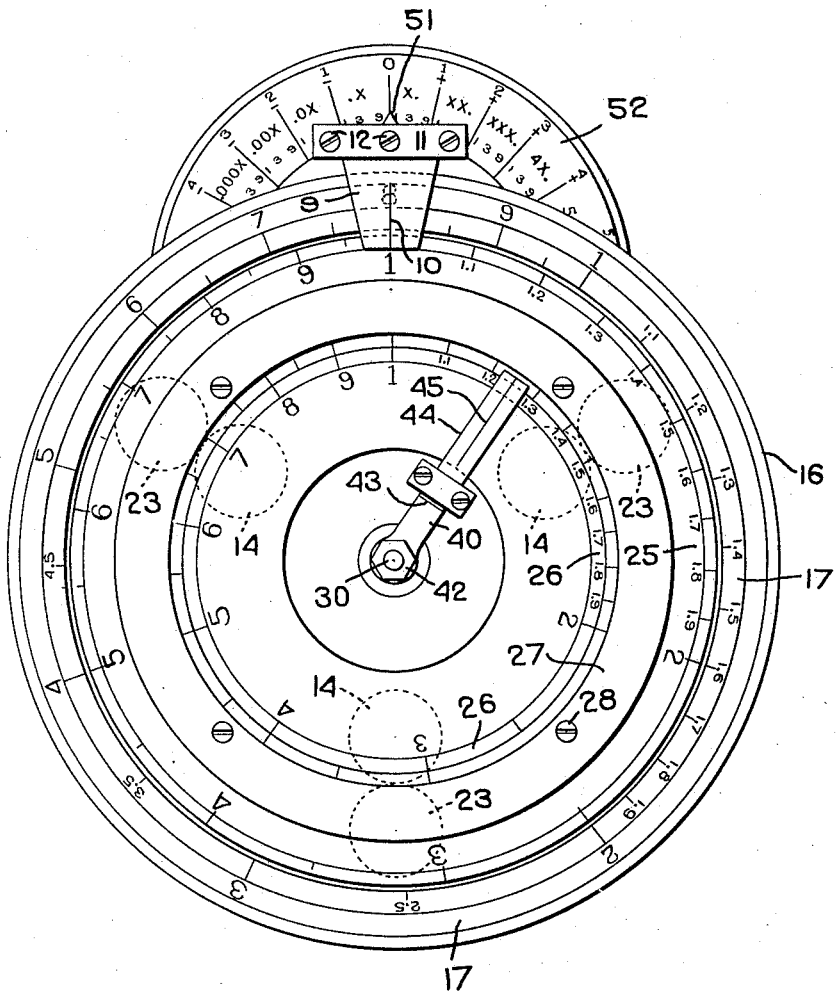
Fig. 2 is a plan view of the slide rule illustrated in Fig. 1.

The preferred embodiment of the invention which is illustrated in Figs. 1 and 2 comprises a stand 1, preferably of circular form, adapted to rest upon a table or other suitable support and having a boss 2 provided with a circular opening 3 forming a handle by means of which the device may be transported. The stand is provided with a hollow triangular boss or bracket 4 having a front preferably flat surface 5 which is inclined at a suitable angle, such as a sixty-degree angle, relatively to the horizontal plane of the stand with the index at the top.

The slide rule comprises a generally flat base 6 preferably of substantially circular form having a lower flat face adapted to engage the flat face 5 of the boss or bracket 4. The base desirably is secured to the bracket by suitable machine screws 7. The upper end of the base is provided with an integral outward extension or boss 8 having a flat top and a transparent plate 9 having a hair line index 10 is secured upon the flat upper end of the boss 8 by a clamping plate 11 and suitable screws 12 extending therethrough into the boss.

The base 6 desirably is provided with three upwardly extending bosses 13 spaced at substantially equal intervals and each preferably provided with a recess to receive and hold a friction member 14 of rubber or other suitable material. The result scale member is in the form of a circular flat plate 15, of hard rubber, Bakelite, or other suitable material which will not shrink, having an upwardly extending peripheral flange 16 presenting a countersunk flat upper surface in which a logarithmic scale 17 is mounted. The result scale supporting plate 15 is provided with a preferably angularly inclined knurled edge 18 adapted to be engaged by the fingers of the operator for manipulating the scale and acting to prevent slippage during the manipulation thereof. The result scale member 15 desirably is provided with a central circular aperture having countersunk in it a hub 19 which is secured to the plate and pinned to a shaft 20 which extends at right angles to and is rotatably and slidably mounted in a suitable journal 21 in the base plate 6. The under flat face of the result scale member 15 rests upon and engages the frictional members 14.

The upper surface of the result scale member is provided with a circular countersink or recess which receives the working scale member which is in the form of a flat plate 22 of hard rubber, Bakelite, or other suitable material, having a hub rotatably mounted upon the shaft 20 and having a lower flat face which rests upon three substantially equally spaced friction members 23 which are seated in countersinks in the upper face of the result scale member. The working scale member has secured to it a disk 24 of Celluloid, or other suitable material, provided at its periphery with a logarithmic scale 25 similarly graduated and complementary to the result scale 17. The disk 24 may be provided with one or more other logarithmic scales 26 which are concentric with and spaced from the scale 25, for purposes which will hereinafter more fully appear.

Suitable means are provided for rotating the working scale member. As illustrated in Figs. 1 and 2 a circular ring 27 is secured by screws 28 to the working scale plate 22 and serves to clamp the disk 24 firmly upon the plate 22. The ring 27 is of a diameter slightly less than the working scale 25 and is provided with an outwardly extending flange provided with an inclined knurled surface 29 adapted to be engaged by the fingers of the operator.

Suitable means are provided for applying the desired amount of pressure to the scale members which are superimposed upon the base 6 to produce the proper amount of friction between the respective scale members and between the result scale member and the base. In the construction illustrated herein the shaft 20 is provided with an upper screw threaded end portion 30 and a coiled spring 31 which encircles the extension 30 is seated at its lower end upon a washer 32 which rests upon the hub of the plate 22 which is rotatably mounted on the shaft 20. The spring 31 abuts at its upper end against a washer 33 which is adjustably positioned by lock nuts 34. By adjusting the position of the nuts 34 the pressure of the spring 31 upon the result scale member can be suitably regulated to permit easy but not free rotation of the work scale relatively to the result scale.

The result scale member 15 is pinned to the shaft 20, as above stated, which has at its lower end a screw threaded reduced end portion 35 and a relatively stronger spring 36 which encircles the reduced portion 35 abuts at its upper end against a washer 37 which is seated against the lower face of the base 6 and at its lower end engages a washer 38 which is adjustable longitudinally of the shaft extension 35 by lock nuts 39.

Inasmuch as the frictional members 14 are located at a less distance from the axis of the scale members than are the frictional members 23, the spring 36 must be heavier by a considerable degree than the spring 31 because when moving the working scale there is a tendency to lift the result scale member thereby compressing the result scale spring 36, thus reducing its effect and lessening the friction between the support and the result scale which is not desirable.

By suitable adjustment of the lock nuts 39 a proper resistance to the rotation of the result scale may be produced which will enable it to be rotated readily and the friction between the result scale member and the working scale member will be sufficient to cause conjoint rotation of said scales when the result scale alone is manipulated. The friction between the result scale and the working scale is sufficiently lighter to enable the working scale to be rotated relatively to the result scale without displacing the result scale. By reason of this construction the result scale and the working scale can be rotated conjointly relatively to the index 10, or the working scale alone rotated relatively to the index 10 to enable computation to be made by the complementary logarithmic scale members in the manner employed by the operation of the complementary scale of a usual straight slide rule.

Inasmuch as the shaft 20 is fixedly secured to the result scale an index may be secured to the shaft to cooperate with the smaller scale or scales of a different nature which are located within the inner periphery of the working scale actuating ring 27. In the present construction an index arm 40, which is provided with a hub mounted upon the reduced portion 30 of the shaft and adjustably clamped thereupon between pairs of lock nuts 41 and 42, is provided with a downwardly bent shank 43 having an offset lower end to which is secured a transparent plate 44 having a suitable hair line 45 providing an auxiliary index which overlies one or more logarithmic scales which are concentric with the working scale 25.

As illustrated in the drawings an auxiliary scale 26 exactly like the work scale 25 is shown and in the computation of a problem upon the working and result scales 25 and 17 the hair line 45 or auxiliary index upon the transparent plate 44 will always register with the reciprocal of the result computed upon the result scale 17; for example, the result of the computation shown on the drawing is 8, as appears on the result scale, and the reciprocal indicated in the supplementary scale 26 is $$\frac{16}{2}$$

which is 1.25. In many instances the determination of such reciprocal is the real result sought. Other scales may be provided in concentric arrangement upon the disk 24, such as sine scales, tangent scales and scales embodying special formula for shortening the process of solution of triangles and other problems.

In the complete operation of the device the operator will before solving a problem manipulate the knurled edge 18 of the result scale to place the index number 1 of the result scale in coincidence with the hair line 10, then by manipulation of the knurled edge 29 of the working scale place the index number 1 of the working scale also in coincidence with the same line 10.

If a multiplication is the first operation, which it must be, the operator by manipulating the knurled edge 18 of the result scale member revolves the two scales together until the desired number on the work scale coincides with the hair line 10, and the number located under the hair line on the result scale will then be the answer so far. The next operation must be that of division, (and if there is no number in the divisor the digit 1 must be substituted.) The number to be divided is next brought under the hair line 10 by manipulation of the knurled edge 29 of the working scale member. This operation does not change the position of the result scale with reference to the hair line and in order to get a result there must be another multiplication, and if no other multiplier appears in the numerator the digit 1 must be again substituted. When multiplied by 1 or by some other number the result now appears under the hair line 10.

It is a rule with this slide rule, as it is with every other slide rule, that the first and last operations must always be that of multiplication and that multiplication and division must alternate.

In this slide rule multiplication is always accomplished by manipulation of the upper knurled surface 18 of the result scale, and division is accomplished by manipulation of the lower knurled surface 29 of the working scale, and in both the numbers on the working scale are only used by being brought into coincidence with the fixed hair line 10 so that after each multiplication the result appears under the hair line on the result scale.

It will be noted that the present slide rule construction is so designed that multiplication is always accomplished by means of the upper knurled surface and division is always accomplished by means of the lower knurled surface which correspond in position to the numerator and denominator of the conventional fraction and this is a valuable feature of the invention since it is natural to assume that the numerator is above and the denominator below as in fractions.

Another feature of the invention consists in providing a simplified and readily observable means for indicating the position of the decimal point in the result of a series of computations.

All slide rules are based on common logarithms whose base is 10; the logarithm of any number being the exponent by which this base must be affected to equal the number. Thus the logarithm of 10 is 1 and the logarithm of 1 is 0. If we take 1 as the unit length of our scale then the end of the scale represents the logarithm of 10 and the beginning of the scale represents the logarithm of 1. Between the beginning and end of the scale are an infinite number of locations which represent as many logarithms of numbers from 1 to 10, more definitely, numbers from 1. to 9.9999 since 10 is really the beginning of the next zone. The middle of the scale would correspond to logarithm .5 and would represent the number 3.1623. The middle of each other unit length of scale, if we employed more than the one length, would have these same digits 31623 but the decimal point would be differently placed, and the logarithm corresponding to these middle points would all be .5 and if in the next zone would be 1.5 and in the next 2.5 and conversely if in next anterior zone it would be −1.5 etc.

The numbers 1. to 9.9999 as they appear in the first zone are the exponents of 10 as are also all the numbers of every zone, and would be written $10^0$ to $10^{.9999}$ and in the next posterior zone $10^1$ to $10^{1.9999}$.

The digits .9999, are the mantissa, and the digits before the decimal point is the characteristic. Each zone has one characteristic but an infinite number of digits in the mantissa if one carried the fractional part to the limit. Usually, however, four digits is sufficiently accurate. The mantissa of each zone is located in the same relative position within the zone. The characteristic represents the zone and consequently the location of the decimal point.

In the working zone, as above, the middle point corresponds to the number 3.16 and the characteristic is 0. The middle point of the next higher zone corresponds to the number 31.6 and the characteristic is 1. 1, 2, 3 being the characteristics of the posterior zones and −1 −2 −3 those of the anterior zones.

Since the mantissa alone determine the digits it is only necessary to use a single zone if one is not interested in the location of the decimal point. Some method must be employed to keep the problem within the zone. In the flat rule there must be a constant change from one index to another, but in the circular slide rule this necessity is obviated since the indexes are coincident one with the other. It is not practical to make the flat rule of sufficient length to do away with the changing of the indices.

To determine the location of the decimal point when employing the flat rule, it is necessary either to use some special apparatus to indicate the decimal point or else resort to a rough arithmetical calculation, this latter method is the usual one but it is tedious and when completed there is often little confidence as to its accuracy.

The decimal point indicating means may comprise a dial which is divided radially into any suitable number of equal divisions and so geared to the result scale shaft that one complete revolution of the result scale will move the dial a distance corresponding to one of its divisions which corresponds to an anterior or posterior zone. These divisions may have proper insignia marked upon them by means of which the position of the decimal point may be directly read at the end of any multiplication performed during the computation of the problem.

The present construction is so designed that the result scale can be readily geared to an indicating device or dial having divisions each corresponding to one revolution of the result scale and representing a zone change. By providing proper insignia upon these divisions the position of the decimal point may be directly read upon completion of any problem or part thereof.

In the construction illustrated in Figs. 1 and 2 of the drawings the dial plate 47 is rotatably mounted upon a stud shaft 48 which preferably is mounted upon a separate base plate 49 which overlies an aperture 50 of sufficient size to permit the insertion therethrough of one of the gears through which rotation is transmitted from the shaft 20 to the dial plate 47. The plate 49 is provided at its upper end with an index finger 51 and the dial plate 47 has secured near its periphery a circular scale 52 having radial lines dividing it into equal divisions, provided with suitable insignia which will designate the position of the decimal point in the result computed by manipulation of the slide rule members.

As illustrated in Fig. 2 the numbers X, XX, XXX, etc., are applied to successive divisions at the right of the center of an index line which is marked with a 0, and indicate respectively the working zone and the successive posterior decimal zones, and the numbers .X, .0X, .00X are applied successively to divisions extending from the left of the 0 point and indicate respectively successive anterior zones. The scale may also be provided with numbers 1, 2, 3, etc. at the ends of the radial division lines having associated with them plus signs extending from the 0 point to the right, and like numbers 1, 2, 3, etc. associated with the minus sign extending from the 0 point toward the left. The numbers 1, 2, 3, etc. are the starting points in the respective zones and represent the initial characteristic of the problem as later more fully explained.

The gear 53, which is rotatably mounted upon the shaft 48, frictionally engages the under face of the dial plate 47, or preferably engages a frictional member or members 54 secured in a recess or recesses in the dial plate. A coiled spring 55, which is interposed between the outer face of the dial plate and a washer 56 which is secured to the shaft 48, presses the dial plate into engagement with the frictional members 54, but enables the dial plate to be rotatably adjusted relatively to the gear 53. The gear 53 engages a pinion 57 on the shaft 58 which is rotatably mounted in a boss 59 in the plate 51, and a gear 60, which is fixedly secured to the shaft 58, engages a pinion 61 which is pinned or otherwise secured to the shaft 20.

In the construction illustrated this train of gearing is so constructed that the dial revolves once to every 24 revolutions of the result scale, and the dial is divided into 24 equal parts each part representing one revolution of the result scale, or which in turn represents one zone change. The insignia upon the dial therefore enables the position of the decimal point to be read directly after any series of computations, whether in a posterior or an anterior zone.

If the problem contained only those numbers which appear upon the working scale, the dial could be permanently geared to the result scale and the location of the decimal point would always be apparent. When, however, numbers are employed in the computation which require more than a single revolution of the result scale in either direction the computation is in effect made in a zone or zones which are anterior to or posterior to the normal zone of a single revolution of the result scale, and if the dial were permanently geared to the result scale the result scale would need to be given such a number of complete revolutions as would correspond to the characteristic values of the respective numbers, for example, with such a fixed dial a problem which contained a number like 316., which properly belongs to the second posterior zone, would necessitate two complete revolutions of the result scale before setting the digits 316 under the hair line 10. If the problem had many such numbers not contained in the working zone, the positioning of the decimal point by successive revolutions in one direction or the other would be cumbersome.

The same correction for actual zones can be made much more easily by initially moving the dial manually the proper number of divisions, and by a simple mental calculation the zone change for the whole problem can be made at one time. To facilitate such change the dial is held frictionally in contact with the gearing so that it can be manually rotated.

Numbers from 1 to 9.9999 are correctly represented on the scale, consequently no change need be made for them. However, numbers from 10 to 99.999 are in the next posterior zone and require one positive zone correction. Numbers from 100 to 999.99 are in the succeeding posterior zone and require two positive zone corrections, etc. Numbers with no digits before the decimal point require negative zone changes in the same manner. A simple formula for initially getting the approximate decimal zone correction is as follows:—Any number used in the problem which has a single digit before the decimal point is correctly represented on the working scale (and on the result scale as well) and consequently may be disregarded, when determining the initial characteristic of the problem. The initial characteristic of the problem may therefore be determined by algebraically adding 1 for each more than one digit before the decimal point and deducting 1 for decimal point, and for each 0 before the first digit, thus, $$\frac{\overset{0}{3.16} \overset{+1}{\times 31.6} \overset{+2}{\times 316.}}{\underset{-1}{.316 \times} \underset{-3}{.00316}} = \frac{+3}{-4} \text{ or } +7$$

After such mental computation the dial 52 is manually set at +7, the characteristic of the problem before solving the problem and further wanderings in the zones are automatically taken care of through the gearing. The result upon solving on the slide rule will indicate the digits 316 and the indicator 51 will point to the division marked 8X which is in the +8 division, showing that the problem has wandered one division or one zone beyond the problems characteristic +8. The answer will be 31,600,000.

By thus preliminarily setting the dial 52 considerable time may be saved in determining the position of the decimal point in the result of the computation.

Figure 3:
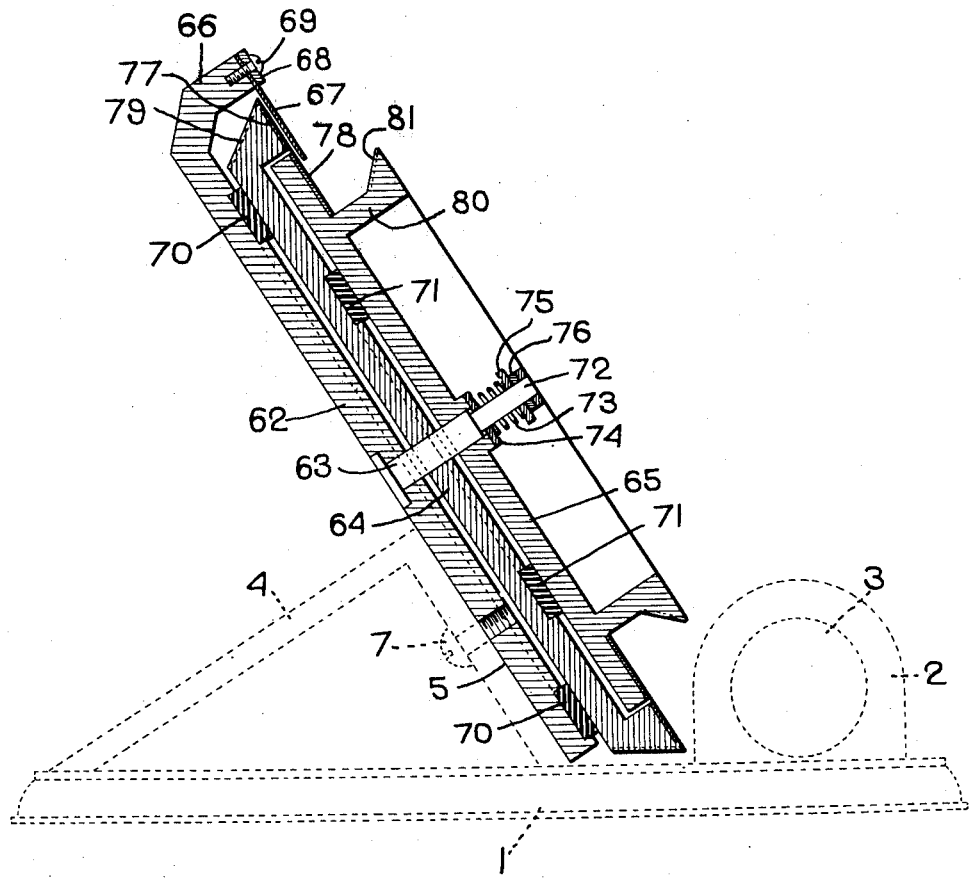
Fig. 3 is a vertical sectional view similar to that illustrated in Fig. 1 showing a somewhat simplified form of the invention.

A simplified form of slide rule is illustrated in Fig. 3 and comprises a flat base 62 which may be mounted upon the inclined face 5 of the bracket 4 of the stand 1 similar to that above described, or if desired may be placed upon a suitable supporting surface having a covering of frictional material which will prevent displacement of the device during the manipulation of the scales. In this construction a boss or shaft 63 is mounted in the central portion of the base and the result scale member 64 and working scale member 65 are superimposed upon the base. In this construction, as in that previously described, the upper end of the base 62 is provided with a forward extension 66 to which a transparent plate 67 having a hair line is secured by a suitable clamping plate 68 and screws 69. Antifriction means such as three anti-friction disks or an annular ring 70 is interposed between the base or support 12 and the result scale member 64, and a similar anti-friction means such as an annular ring 71 of less diameter is interposed between the result scale member 64 and the working scale member 65. In this construction the post or shaft 63 is provided with a screw threaded portion 72 of smaller diameter and a single coiled spring 73 is interposed between a washer 74 resting upon the hub of the working scale member and a washer 75 which is adjustably held upon the reduced portion 72 of the shaft by lock nuts 76. In this construction, as in that previously described, the working scale member is provided at its periphery with a logarithmic scale 77 and the periphery of the working scale member is provided with a like complementary logarithmic scale 78 of the character above described, said scales being in juxtaposition to each other and in proper relation to the index plate 77 having a hair line as above described.

Suitable means are provided for rotating the respective scales manually. The result scale member is provided with an inclined knurled surface 79 and the working scale member may be conveniently provided with an integral upwardly extending annular boss 80 having an outwardly extending flange provided with an inclined knurled surface 81 adapted to be engaged by the fingers of the operator.

The result scale member and the working scale member are manipulated in the same manner as in respect to the preferred embodiment of the invention illustrated in Figs. 1 and 2. In this construction in which a single spring is employed to force the superimposed result scale member and working scale member toward the support or base plate, a greater amount of friction is produced between the working scale member and the support or base by reason of the fact that the friction member or ring 70 is at a greater radial distance from the axis of revolution of the scale members than is the friction ring 71 which is interposed between the result scale member and the working scale member.

By reason of this construction a very economical endless slide rule may be produced upon which accurate computations can be made.

While in the preferred embodiments of the invention the rotatable result scale and working scale members are shown as in the form of flat disks, it will be obvious that the result scale and working scale members may be provided at their peripheries with suitably associated cylindrical logarithmic scales, and with a suitably positioned stationary index. The term "stationary support" is used herein in a relative sense as stationary with respect to the hair line. The hair line may be mounted in a fixed position or may be mounted rotatably on the base for convenience in placing it in a position of good lighting effect, etc., but as far as the working of a problem is concerned it is in a fixed position and stationary as far as the support is concerned. The support itself need not be in any stationary position as it may be placed on any surface with sufficient friction to maintain it in a substantially stationary position when working a problem.

It will therefore be understood that the particular embodiments of the invention shown and described herein are of an illustrative character and that various changes in form, construction and arrangement of parts may be made within the spirit and scope of the following claims.

Having thus described the invention, what is claimed as new, and desired to be secured by Letters Patent, is:

1. An endless slide rule comprising a stationary support having a stationary index, manually operable members having juxtaposed complementary circular working and result scales provided with graduations proportional to the logarithms of the numbers on said scale, mounted on said support to rotate about a common axis relatively to each other and to said stationary index, and having means by which said scales may be manipulated, means located at different radial distances from said axis for continuously applying different degrees of friction to the respective scale members to cause conjoint rotation of said scales upon manual rotation of the result scale and to prevent rotation of said result scale relatively to said stationary support and its index upon manual rotation of said working scale.

2. An endless slide rule comprising a stationary support having a stationary index, manually operable members having juxtaposed complementary circular working and result scales provided with graduations proportional to the logarithms of the numbers on said scale mounted on said support to rotate about a common axis relatively to each other and to said index, frictional means interposed between said circular members acting to cause conjoint rotation of said scale members upon manual rotation of the result scale, and frictional means between said result scale and said stationary support acting upon said result scale to prevent rotation thereof upon manual rotation of said working scale.

3. An endless slide rule comprising a stationary support having a stationary index, a shaft rotatably mounted in said support, a result scale member rotatable about the axis of said shaft, having a peripheral scale provided with graduations proportional to the logarithms of the numbers on said scale, frictional means interposed between said result scale member and said support, a working scale member rotatably mounted on said shaft having a peripheral scale complementary to said result scale and in juxtaposition thereto, frictional means interposed between said result scale member and said working scale member acting to apply less frictional resistance to the relative rotation of said scale members than the resistance between the result scale member and the support, adjustable resilient means respectively acting upon said working and result scale members in conjunction with said frictional means to apply less resistance to relative rotation between said scale members than the resistance between the result scale member and the support, and means for manipulating the respective scale members.

4. An endless slide rule comprising a stationary support having a stationary index, a shaft rotatably mounted in said support and capable of axial movement, a circular result scale member, having a peripheral scale provided with graduations proportional to the logarithms of the numbers on said scale, fixedly secured to said shaft, frictional means interposed between said result scale member and said support, a spring mounted on said shaft acting to move said shaft axially to apply frictional resistance to the rotation of said result scale, a working scale member rotatably mounted on said shaft having a peripheral scale complementary to said result scale in juxtaposition thereto, frictional means interposed between said result scale member and said working scale member, and a relatively lighter spring acting to hold said working scale in frictional engagement with said result scale, but with less frictional resistance to rotation than that interposed between the result scale and said support, and means for manipulating the respective scales.

5. An endless slide rule comprising a stationary support having a stationary index, a shaft mounted in said support, a circular result scale fixedly secured to said shaft having an upwardly offset circular peripheral portion, a circular scale mounted on said offset portion having graduations proportional to the logarithms of the numbers on said scale, a flat working scale supporting member rotatably mounted on said shaft within the offset portion of said result scale member and having a peripheral logarithmic scale complementary to said result scale lying in the same plane with and in cooperative relation to said result scale and to said index, means for applying frictional resistance to rotation of said result scale relatively to said stationary support, and means for applying such lesser frictional resistance to rotation of said working scale relative to the result scale that the working scale may be rotated without causing rotative movement of the result scale relatively to said stationary support and its index.

6. An endless slide rule comprising a stationary support having a stationary index, a rotatable and axially movable shaft mounted in said support, a circular result scale member fixedly secured to said shaft having an upwardly offset circular peripheral portion, a circular scale mounted on said offset portion having graduations proportional to the logarithms of the numbers on said scale, a flat working scale supporting member rotatably mounted on said shaft within the offset portion of said result scale member provided with a peripheral circular scale complementary to said result scale and lying in the same plane therewith and in cooperative relation to said result scale and to said index, means including a spring acting on said shaft to apply frictional resistance to the rotation of said result scale, and means for applying such lesser frictional resistance to the relative rotation between said working scale and said result scale that the working scale may be rotated without causing rotative movement of the result scale relatively to said stationary support and its index.

7. An endless slide rule comprising a stationary support having a stationary index, a rotatable and axially movable shaft mounted in said support, a circular result scale member fixedly secured to said shaft having an upwardly offset circular peripheral portion, a circular scale mounted on said offset portion having graduations proportional to the logarithms of the numbers on said scale, a flat working scale supporting member rotatably mounted on said shaft within the offset portion of said result scale member provided with a peripheral circular scale complementary to said result scale and lying in the same plane therewith and in cooperative relation to said result scale and to said index, means including a spring acting on said shaft to apply frictional resistance to the rotation of said result scale, means for applying such lesser frictional resistance to the rotation of said working relative to said result scale, that the working scale may be rotated without causing rotative movement of the result scale relatively to said stationary support and its index, an auxiliary scale on said working scale member concentric with said peripheral working scale, and an auxiliary index member mounted on said shaft having an index line or point located in cooperative relation to said auxiliary scale operable when a computation is made upon the working and result scales to indicate a function of the result thus computed.

8. An endless slide rule comprising a stationary support having a flat surface and provided with an index, a shaft mounted in said support, circular result and working scale members mounted on said shaft in superimposed relation relatively to each other and to said support and having respectively flat surfaces parallel to the flat surfaces of said support and provided at their peripheries with complementary scales located in cooperative relation to each other and to said index and having graduations proportional to the logarithms of the numbers on said scales, resilient means for forcing said superimposed scale members toward said support, three substantially equally spaced frictional members interposed between adjacent flat surfaces of said scale supporting members and substantially equally spaced frictional members interposed between the flat surfaces of said result scale and said support so positioned as to produce in cooperation with said resilient means greater resistance to rotation of said result scale member than to the rotation of said work scale member relatively to the result scale member.

9. An endless slide rule comprising a stationary support provided with an index, a shaft mounted in said support for rotation and axial movement, a flat circular result scale member fixedly secured to said shaft provided with a peripheral logarithmic scale having graduations proportional to the numbers on said scales, a working scale member rotatably mounted on said shaft in superimposed relation to said result scale member and having a similar peripheral logarithmic scale in juxtaposition to said result scale, a spring acting on the lower portion of said shaft to draw the work scale supporting member toward said support, a relatively lighter spring mounted on said shaft acting upon said work supporting scale member to press said scale member toward the result scale and the support, three substantially equally spaced frictional members interposed between said working scale member and said result scale member and located in proximity to the periphery of said working scale member, and three equally spaced frictional members interposed between said result scale member and said support and means for adjusting the tension of said springs to correlate the pressure of the respective springs to the resistance produced by the respective frictional members thereby to produce greater resistance to rotation of said result scale member than to the rotation of said work scale member relatively to the result scale member.

10. An endless slide rule comprising a stationary support having an index, manually operable members, having juxtaposed complementary circular working and result scales provided with graduations proportional to the logarithms of the numbers on said scale, mounted on said support to rotate about a common axis relatively to each other and to said index, a single spring acting to force said scales and said support together, frictional means interposed between said circular members acting to cause conjoint rotation of said scales upon manual rotation of the result scale, and frictional means interposed between said result scale and said support at a substantially greater distance from the axis of rotation than that at which friction is interposed between said scales acting to prevent rotation of said result scale upon manual rotation of the working scale.

11. An endless slide rule comprising a stationary support having a flat surface and provided with an index, a shaft mounted in said support perpendicular to said flat surface, circular result and working scale members mounted on said shaft in superposed relation for rotation relatively to each other and to said support and having respectively flat surfaces parallel to the flat surface of said support and provided adjacent their peripheries with complementary scales located in cooperative relation to each other and to said index and having graduations proportional to the logarithms of the numbers on the scales, an annular friction member interposed between the adjacent flat surfaces of said scale members, and an annular friction member of much greater diameter interposed between the adjacent flat surfaces of said result scale member and the flat surface of said support, and adjustable resilient means for forcing said scale members toward said support.

12. An endless slide rule comprising a stationary support having a stationary index, a shaft mounted in said support, a circular result scale member fixedly secured to said shaft having an upwardly offset circular peripheral portion provided with an upwardly and outwardly inclined circumferential knurled surface to be grasped by the fingers, a circular scale mounted on said offset portion having graduations proportional to the logarithms of the numbers on said scale, a flat working scale supporting member rotatably mounted on said shaft within the offset portion of said result scale member and having a peripheral logarithmic scale complementary to said circular scale lying in the same plane with and in cooperative relation to said result scale and to said index, a circular ring mounted upon said working scale member concentric with and within said working scale provided with an upwardly and outwardly inclined knurled surface adapted to be engaged by the fingers of the operator, means for applying frictional resistance to rotation of said result scale relatively to said stationary support, and means for applying such lesser frictional resistance to the rotation of said working scale relatively to the result scale that the working scale may be rotated without causing rotative movement of the result scale relatively to said stationary support and its index.

HOWARD GILMORE.